United States Patent [19]

Graham

[11] 4,132,396

[45] Jan. 2, 1979

[54] GLUEING CLAMP ASSEMBLY

[76] Inventor: George W. Graham, 2641 S. Gilpin, Denver, Colo. 80210

[21] Appl. No.: 893,882

[22] Filed: Apr. 6, 1978

[51] Int. Cl.² .......... B23P 19/00

[52] U.S. Cl. .......... 269/41; 269/113; 269/124; 269/210

[58] Field of Search .......... 269/41–42, 269/113, 115, 124, 125, 207, 210, 287

[56] References Cited

U.S. PATENT DOCUMENTS

| | | | |
|---|---|---|---|
| 100,642 | 3/1870 | Lambert | 269/210 X |
| 3,590,458 | 7/1971 | Day | 269/41 X |

*Primary Examiner*—Robert C. Watson

*Attorney, Agent, or Firm*—Richard D. Law

[57] ABSTRACT

Four bar clamps arranged with slots in the bars interlock to form a rectangular clamping assembly for holding rectangular and box-like members in position for glueing. The bar clamps include adjustable length means between a fixed pressure pad and threaded adjustable pressure pad.

4 Claims, 5 Drawing Figures

Fig-1
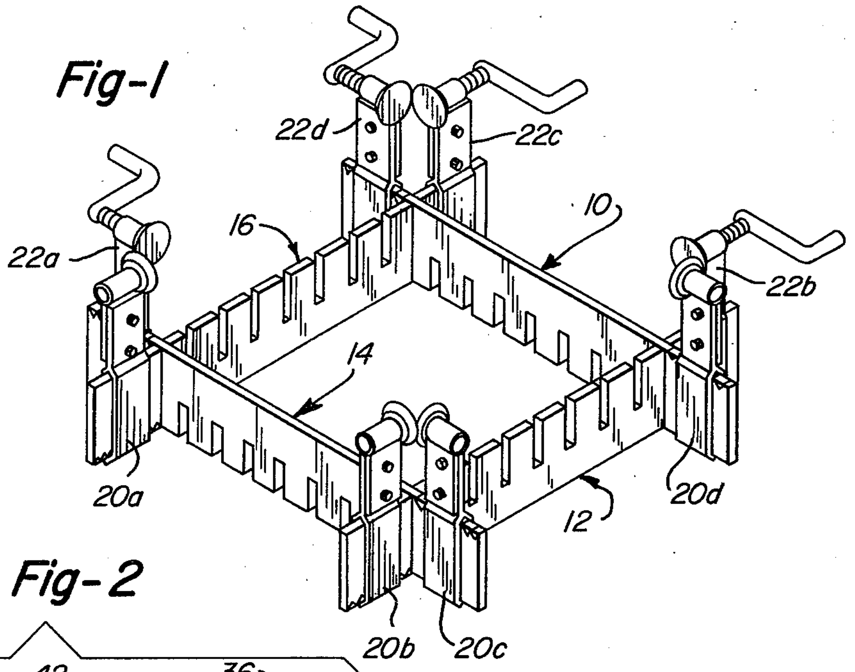
Fig-2
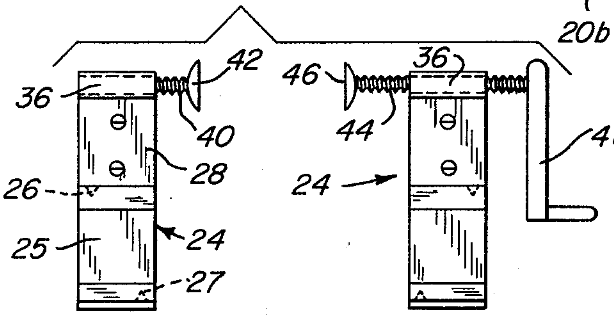
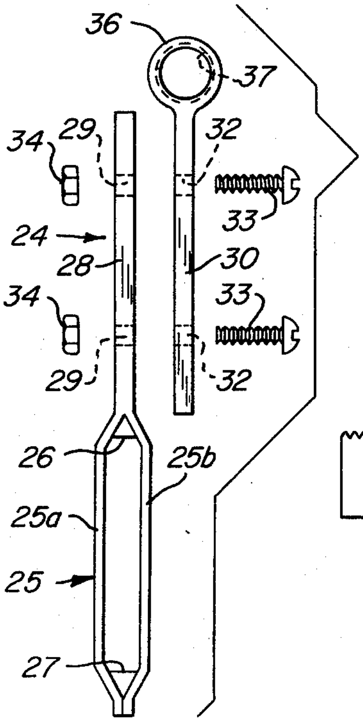
Fig-5
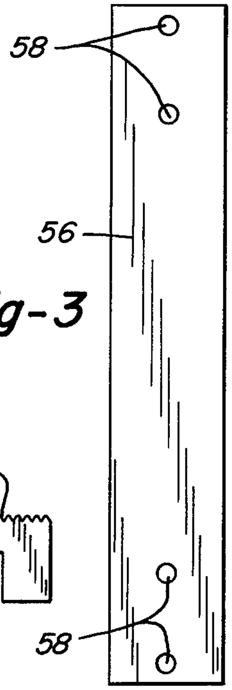
Fig-3
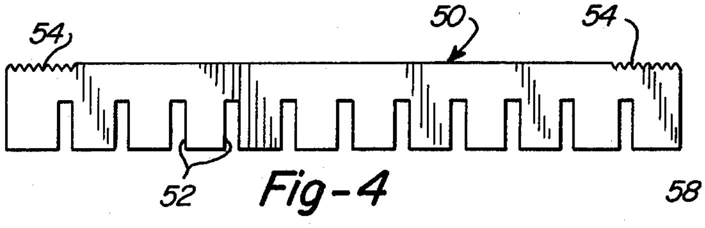
Fig-4

GLUEING CLAMP ASSEMBLY

In building or repairing furniture and the like, it is often necessary to hold square or rectangular members by the four corners and in four directions; that is, a clamp on each side of a corner. In the past, four separate clamps, (usually bar clamps) were required for the holding, and each clamp was separately applied to the work piece. This created problems as to holding the parts of the work piece in proper position during the process of applying the clamps, and positioning each clamp so as not to interfere with the other clamps. Various other methods of clamping square or rectangular pieces have been used, for example, cord or cable clamps, fixed clamps on a base, etc., but each has certain disadvantages.

THE INVENTION

According to the present invention, there is provided an integrated bar clamp assembly which interlocks separate bar clamps for forming an assembly for clamping square or rectangular members by their four corners and in four directions. The unit provides four slotted bars for bar clamps which permit interlocking of the bars, providing all the clamp or pressure pads in the same plane.

OBJECTS AND ADVANTAGES OF THE INVENTION

Included among the objects and advantages of the invention, is to provide an integrated assembly of bar clamps arranged for clamping square and rectangular members.

Another object of the invention is to provide interlocking bar clamps with the clamping or pressure pads in the same plane.

Still another object of the invention is to provide simple interlocking means for the bars of bar clamps for forming an integrated rectangular clamping arrangement of bar clamps.

Yet another object of the invention is to provide a clamping assembly for rectangular work pieces holding the four corners and in four directions.

GENERAL DESCRIPTION OF THE DRAWINGS

These and other objects and advantages of the invention may be readily ascertained by referring to the following description and appended illustrations, in which:

FIG. 1 is a perspective view of an assembly of bar clamps arranged in a rectangular pattern, according to the invention;

FIG. 2 is a side elevational view of the stationary pressure pad mount and the adjustable and the adjustable pressure pad mount for mounting on a bar;

FIG. 3 is an extension member for a stop or clamp mount;

FIG. 4 is a side elevational view of a slotted bar for a bar clamp according to the invention, and, FIG. 5 is an exploded view of a pressure pad mount assembly for a bar clamp according to the invention.

SPECIFIC DESCRIPTION OF THE INVENTION

As illustrated in FIG. 1, four slotted bars of a bar clamp assembly are interconnected by means of interlocking slots, where the bars, shown generally by 10, 12, 14 and 16, are arranged in a rectangular pattern with their ends extending beyond the enclosure of the rectangle. On the end of each of the bars is placed a pad mount or carriage, for example, carriage *20a*, *20b*, *20c* and *20d* are carriages for stationary pressure pads, explained below, while the carriage *22a*, *22b*, *22c* and *22d* provide a carriage for an adjustable pressure pad. The bars are slotted approximately half way through, so that when the two bars are placed with their slots mating, the upper and lower edges of the bars are in general planar alignment. Each of the carriages are provided with an extension which places the stationary pressure pad or the adjustable pad in the same plane above the plane of the bars which are interconnected. The bars, of course, may be made in different lengths so as to provide different sizes and shapes of a rectangle or square.

Each bar clamp includes a slotted bar with a carriage or pressure pad mount on each end. One carriage includes an adjustable clamping pad with means for adjusting the clamping pad against the work backed agianst the stop pad. As shown in FIG. 2, a pair of carriages are shown, and since they are similar units, they are both shown in general by numeral 24, with the left hand carriage provided with a backing or stop paid 42 mounted on a threaded stud 43, which is threadedly engaged with a threaded head 36. Each carriage is composed of two parts, and a general description of FIG. 5 shows both parts. The carriage includes an opening 25 for telescoping over a bar, and internally in the bar opening is a downwardly depending dog or tooth 26 on one upper side, and an upwardly depending tooth 27 is on the bottom opposite side of the carriage. These teeth are arranged to engage teeth on the bar as explained below. Extending upwardly beyond the opening 25 is a neck portion 28, having bores or passages 29 therethrough. As shown in FIG. 5, to be attached to the neck 28 is a neck 30 of the stud holder portion of the carriage which may be fastened by means of screws 33 passing through openings 32 in the neck 30 and through the openings 29 in the neck 28. The unit is then secured together by means of nuts 34 threaded onto the screws 33. The threaded head or stud holder 36 includes a threaded passage 37 for threadedly engaging the threaded studs secured to the work engaging pressure pads. The righthand carriage of FIG. 2 includes an elongated threaded stud 44 threadedly engaged with the thread head 36, and a pressure pad 46 is rotatably mounted on one end of the stud 44. A crank or handle 48 is mounted on the other end of the stud 44 providing adjustment of the pad 46 against a work piece. The lefthand carriage is provided with a stud 40 threadedly engaged in the threaded bore of head 36. A rotatable pressure pad 42 is mounted on the stud 40. This is in effect the stationary or back pad. The stud provides some adjustment when placing a work piece between the two pressure pads.

The carriages shown in FIG. 2 are arranged with a distance between the stud holder 36 and the bar opening 25. In one form, this distance is the length of the neck 28. In some cases however, it may be necessary to extend the distance, and an extension bar, FIG. 3, may be used to join the headpiece with the bar holding piece. In this instance, a bar 56 provided with bores 58 are arranged to mate with either set of the bores 29 or 32. The length of the bar 56 is determined by the required distance between the plane of the pressure pads of the clamp assembly and the plane of the bar assembly. This may variously extend from several inches to several feet or more.

A bar 50, FIG. 4, which may be any length desirable, includes a plurality of slots 52 preferably equally spaced along the bottom side of the bar 50. On the top side of the bar are a series of teeth 54 at each end. These teeth are arranged to engage either dog 26 or 27 for holding a carriage place on the bar at the desired position. The series of teeth 54 may either be on the bar edge opposite the slots 52, or the series may be placed on the bar edge (on the ends) containing the slots 52. The length of the series of teeth may be changed as desired.

As shown in FIG. 1, the bars 10–16 are arranged with the series of teeth on the slotted side of the bar. Thus, bar 12 with teeth on the slotted side engaged the top dog in carriage **20*b* on one end, and the series on the opposite end engages the top dog in carriage 22*b* on the other end. Bar 14, on the other hand, is reversed from the bar 12, with its slots in downward position, so that the teeth on the bar 14 (on the slotted side) engaged the dog 27 in the bottom of the carriage 20*c* and the dog in the bottom of the carriage of 22*a***. In a similar manner, the carriages at the other corners have one of the other dog engaged into the teeth on the bar to securely hold each carriage in position on the bar.

With the bar arrangement in the assembly of FIG. 1, a rectangular or square work piece or object may be placed in position with a clamp pad and stop pad pressing against each side of each corner of the work member. For this purpose, after carriages are moved to the rough distance, the stop pad may be unthreaded to contact the edge of the work piece. The opposite clamp pad may now be threaded inwardly to clamp the work member between the two pads. This occurs on all four corners and in four different ways, using the four adjustable clamp members. As explained before, the plane of the pressure pads of the carriages may be varied in distance from the bars by means of extenders, as shown in FIG. 3, so that the pressure pads may be placed in correct position for a glueing operation. Furthermore, the shape and size of the assembly is easily changed by changing the position of the innerlock slots or by changing the length of the bars. The dogs in the carriages engage a tooth of the series of teeth on the ends of a bar, and pressure on the pad forces the dog deeper into the tooth, providing secure holding of the carriage on the bar in the desired position.

While the invention has been described with a particular embodiment, there is no intent to limit the spirit or scope of the invention to the precise details, except as defined in the following claims.

What is claimed is:

1. A clamp assembly for rectangular work pieces providing holding on its four corners in four directions, comprising:

(a) four bar clamps each including a bar, lockable carriage means reciprocably mounted on each end of each bar, head means releasably secured to each lockable carriage means with an adjustable stop pad mounted in one head on each bar clamp and an adjustable pressure pad in the opposite head means and means for releasably locking each carriage in a predetermined position on the bar end on which it is mounted, and;

(b) a plurality of spaced slots in each bar extending from one edge of the bar to approximately the center thereof, arranged to mate with a slot of the other bars forming a rectangular frame of the bars with the ends of the bars extending outwardly from the enclosure, with the top edges of the bars in general planar alignment and with said stop pads and said pressure pads in general planar alignment spaced from the plane of the top edges of said bars.

2. The assembly of claim 1, wherein each head means is mounted on extension means providing an adjustable distance of the plane of said stop pads and said pressure pads above the plane of the top edge of said bars.

3. The assembly of claim 1, wherein said slots in said bars are spaced equidistance along the bar.

4. The assembly of claim 1, wherein each said carriage includes a depending extension and each said head means includes a depending extension, and fastening means securing said extensions together of both to an extension means for changing the distance between each carriage and each head means.

* * * * *